Oct. 13, 1936.                C. M. LEATHERMAN                 2,057,336
                              PENDULUM INCLINOMETER
                              Filed Nov. 29, 1930
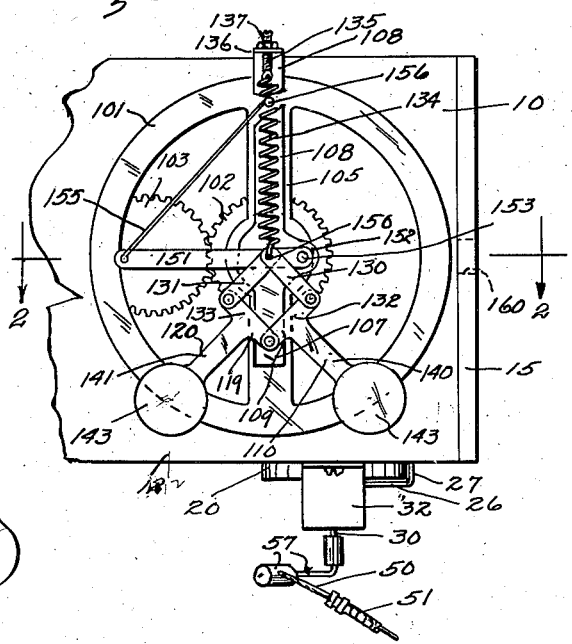
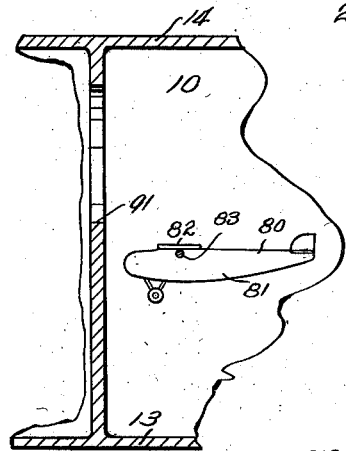
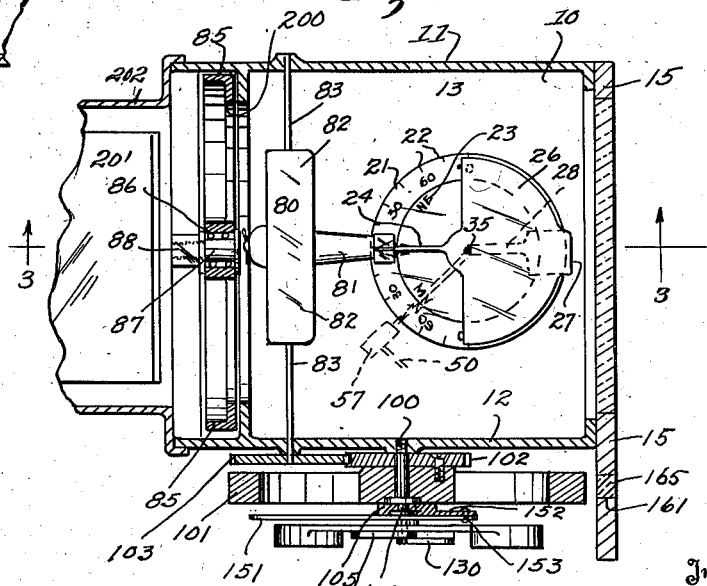
Inventor
CLARENCE M. LEATHERMAN
By Frank D. Gray
   Attorney

UNITED STATES PATENT OFFICE 2,057,336

PENDULUM INCLINOMETER

Clarence M. Leatherman, Coldwater, Mich., assignor of two-thirds to Coldwater Instrument Works, a copartnership composed of Charles D. Hyatt and Clarence M. Leatherman, and one-third to Walter O. Hulsberg, Coldwater, Mich., and Paul Eyster, Angola, Ind.

Application November 29, 1930, Serial No. 498,990

6 Claims. (Cl. 33—215)

This invention relates to a pendulum inclinometer and especially to such an instrument which will indicate the position of the ship relative to the ground and the horizon, and has for its general object the provision of an instrument which will increase the safety of flying.

A further object of this invention is to provide an instrument which will indicate to the pilot the vital action of the plane under all possible weather conditions.

A more specific purpose is to provide an inclinometer which will enable the pilot to see at a glance the relative position of his ship to the horizon and the ground. A further object is to enable the pilot to hold the plane in level flight, parallel with the horizon, and provide a device which will indicate the angle of departure from such condition in degrees.

A further object is the provision of an instrument which will indicate to the pilot the degree of the climb as the ship noses up, or the degree of the dive if the ship should nose downward.

Other features of my invention will be explained by reference to the accompanying drawing showing the preferred embodiment thereof and in which, Fig. 1 is a side elevation of the instrument to indicate the angle of departure from level flight in degrees;

Fig. 2 is a horizontal section and is indicated by the lines 2—2 in Fig. 1.

Fig. 3 is a detail vertical section and is indicated by the lines 3—3 in Fig. 2.

My improved device or instrument includes a mechanism which indicates to the pilot whether or not the ship is flying on an even keel, that is whether or not the nose of the ship is pointed upward or downward relative to the earth. These several improvements have been gathered together to form a composite indicating device which may be located immediately in front of the pilot so that he may tell at a glance the flight conditions of his aircraft.

In the drawing the instrument is shown as being housed in a boxlike casing 10, comprising side walls 11 and 12, bottom and top walls 13 and 14, front and rear walls 15 and 16 respectively. This casing is rigidly mounted on the airplane in any convenient manner. As illustrated in the drawing, I have shown the casing 10 as being mounted adjacent the top of an elongated boxlike structure 18, which is rigidly secured to the bottom of the fuselage of an aircraft, in any well known manner.

The direction indicating device or compass is mounted in the bottom wall 13, and includes a compass 20, which may be of any well known type either earth induction or gyroscopic and which has a horizontal dial.

To assist the pilot in holding the ship level in flight, parallel with the horizon, and ground I prefer to mount a miniature ship within the casing 10. As illustrated in the drawing, this miniature ship is indicated at 80 and comprises a fuselage member 81 and suitable wings 82. The miniature ship 80 is mounted on a transversely extending rod or shaft 83 carried by the side walls 11 and 12 of the casing, and which lies substantially in the center of a vertical plane which is located a short distance in front of the compass thereby preventing interference with the pilot's vision of the latter. The miniature ship is so mounted that the axis of the wings thereof lie at all times parallel with the axis of the wings of the plane in which the instrument is mounted.

Immediately in front of the miniature ship is a rotatable flanged disc 85 which is mounted on a suitable ball-bearing unit 86 carried by a stub shaft 87. The shaft 87 is rigidly mounted on a bracket 88 which is secured by suitable bolts 89 to the base 13 of the casing. The lower portion of the disc 85 is weighted as at 90 so that gravity will tend to hold the disc in the same position relative to the earth regardless of the position of the plane. The disc 85 has a web or face 92 which normally extends upwardly to the center of the circle, and the uppermost edge 93 of which forms a true horizontal line (relative to the earth,) and which edge acts as an artificial horizone line. Under normal conditions, that is, when the wings of the airplane are parallel with the horizon, the upper edge 93 of the web 92 will be parallel with the axis of the wings of the miniature ship thereby forming an artificial horizon line. However, when the wings of the airplane are tilted, thereby becoming non-parallel relative to the horizon, the edge 93 of the web 92 which forms the artificial horizon line for the miniature ship will be actuated by gravity, and tilted relative to the axis of the wings 82 of the miniature ship, thereby indicating to the pilot the tilt of the wings of the plane.

For convenience I find it desirable to show the angle of tilt or departure from the horizon line in degrees. For this purpose that portion of the disc adjacent the plane may be marked in degrees. It will now be noted that the artificial horizon line is tilted slightly from the axis of the wings of the miniature ship 80 and from the upper edge of a wall or partition 91 of the casing, which edge lies in the same plane as the horizontal axis of the wings of the miniature ship. This indicates to the pilot that the wings of his plane are tilted that amount from the horizon.

This miniature ship and horizontal line are coincident in the case of perfect flying only. If one wing is low, one side of the horizon line will immediately show over the top of the miniature ship and will indicate which wing is low and the degree thereof. In banking the plane when making a turn, centrifugal force will counteract the action of gravity on the weighted disc 85 and the artificial horizon line coincide with the axis of the wings of the miniature ship when a perfect bank is made, however when an improper bank is made the centrifugal force will either overcome or will not balance the force of gravity, and the artificial horizon will not coincide with the axis of the wings of the miniature ship, and will therefore indicate a slippage, and gives the direction and angle of such slippage. This is due to the fact that the angle of a perfect bank is the component of the forces of gravitation and the centrifugal force of the plane, and as the weighted disc 85 is respondent to both of these forces as is the plane itself, any departure from the proper banking of the plane will be a departure from the component of these forces and therefore, will show relative movement between the artificial horizon and the axis of the wings of the miniature ship.

As heretofore mentioned the instrument includes a mechanism which indicates to the pilot, whether or not the airplane is flying on an even keel, that is whether or not the nose of the plane is pointing upward or downward. To accomplish this, I prefer to provide a rotary disc 101 which is located at one side of the casing 10 and which rotates in a plane at right angles to the plane of rotation of the disc 85 and which plane is parallel to the axis of flight of the airplane. I prefer to connect this rotary disc 101 with the miniature plane 80 in such a manner that when the airplane noses up for a climb the miniature ship 80 will do likewise, also when the plane points downward as in a dive, the miniature ship will do likewise, in fact, the miniature ship will virtually go through the same performance within the casing, or relative to the casing 10 as the large ship does with respect to the earth, and thereby enable the pilot to know at all times the position of his airplane with reference to the earth. I prefer to so actuate this device that no disturbance of the elements can alter this relationship.

The disc 101 is rotatably mounted on a stud 100 which is rigidly secured to the side wall 12 of the casing 10. Rigidly secured to this disc 101 is a gear 102 which meshes with a gear 103 rigid with the shaft 83 which carries the miniature ship. Hence as the disc 101 is rotated it will cause the miniature ship to nose up or down depending upon the direction of rotation of the disc.

I find it expedient under average flying conditions to operate the rotary disc by gravity, however I find that when the plane is brought quickly into a dive or climb, gravity will not act quick enough to show the true angle of such climb or dive, I therefore find it expedient to actuate the rotary disc by a mechanism which is respondent both to gravity and centrifugal force.

As illustrated in Figs. 1 and 2 I mount a lever 105 on a pivot 106 carried by the stud 100. This lever has a relatively short arm 107 which extends downwardly and a comparatively long arm 108 which extends upwardly. Pivotally secured to the arm 107 of the lever 105 is an arm 109 of a T-shaped lever 110 and an arm 119 of a second T-shaped lever 120. Suitable links 131 and 130 are connected to the levers 120 and 110 respectively. The links 130 and 131 are in turn connected to a common pivot 150 mounted on a bar 151 which is pivoted at one end to a laterally extending ear 152 of the lever 105 as at 153. The other end of the bar 151 is connected by the link 155 to a pin 156 located on the disc 101.

One end of a suitable tension spring 134 is connected to the pivot 150 and the other end secured to an adjusting bolt 135 carried by an outwardly extending portion 136 of the upper arm 108 of the lever 105. A suitable adjusting nut 137 is provided to lock the spring in its adjusted position. The levers 110 and 120 are provided with substantially downwardly extending arms 140 and 141 respectively, to which arms are secured suitable weights 143.

When centrifugal force, such as results from the quick upward movement of the plane, acts on the weights 143, they are drawn approximately downwardly, and at the same time drawing the pivot 150 downwardly and lengthening the spring 134 whose tenseness will serve to return the parts to their normal position. This acts through the parallelogram, (consisting of the arms 132 and 133 of the levers 110 and 120, and the links 130 and 131) and causes the bar 151 to be rocked counter clockwise about its pivot 153. This causes the link 155 to rotate the disc 101 and the gear 102 in a counter clockwise direction and the gear 102 rotates the gear 103 and the shaft 83, in a clockwise direction thereby pointing the miniature ship upward, to indicate the actual position of the main plane. It is also of importance to note that the links 130 and 131 are pivoted at point 150 which is far in the rear of the fixed stud 100, as made clear in Fig. 2 of the drawing—these parts 100 and 150 being quite independent in construction and operation.

When gravity acts upon the weights 143, it tends to rock the entire linkage and leverage about the pivot 106 thereby causing the link 155 to impart a rotative movement to the disc 101. Hence it will be seen that as the plane noses upward both gravity and centrifugal force will tend to rotate the disc 101 and in event of a continued upward movement of the plane gravity will act on the disc and maintain it in its rotated position. As this disc is geared to the miniature ship it will likewise be rotated thereby indicating to the pilot the position of his ship relative to the ground.

When a downward force is applied to the weights 143, due to the upward motion of the plane, the right hand weight moves clockwise and the left hand weight moves in counter clockwise direction, about their respective pivots. The angle between the links 130 and 131 is increased moving their spaced ends and common pivoted connection with the arm 151 downward, thereby moving or swinging the arm 151 counterclockwise about its pivot 153 and moving the disc or rotor 101 in a counterclockwise direction. Likewise centrifugal force acts to align each weight 143 and its pivotal connection to the arm 105, with the pivot about which the arm swings. Such a movement likewise increases the angle between the links 130 and 131, thereby rotating the disc 101 counterclockwise as before.

It is desirable to indicate to the pilot, the angle of tilt of the plane, and to this end the periphery of the disc 101 may be graduated into degrees as indicated at 160 on Fig. 1. The front wall 15 of the casing has an opening 161 through which the periphery disc is visible. Suitable indicating marks provided on the front wall 15, are adapted to coact with the markings 160 on the disc to indicate to the pilot the angle of tilt of his plane. If desired, the opening 161 may be covered by a suitable transparent insert 165.

Having set forth the principles of my invention, and described and illustrated an embodiment thereof for practical use, what I claim and desire to secure by Letters Patent, is—

1. An aeronautical inclinometer comprising a support, a miniature airplane mounted to tilt fore and aft in said support, weighted means rotatively mounted in said support to form an artificial horizon line associated with said airplane, and to cause a relative angular movement between said artificial horizon line and the transverse axis of said miniature airplane, means responsive to the inclination of the craft and connected with said miniature airplane to cause proportional movement of said miniature airplane about its transverse axis, and a rotor associated with said last named means to indicate in degrees such movement with respect to the support.

2. An aeronautical inclinometer comprising a support, a miniature ship mounted to tilt fore and aft in said support, weighted means rotatively mounted in said support to form an artificial horizon line associated with said ship, means actuated by gravity and centrifugal force to move said miniature ship about a transverse axis, and a rotor associated with said actuating means to indicate in degrees such movement with respect to the support.

3. An aeronautical inclinometer comprising a support, a miniature air ship mounted to tilt fore and aft in said support, gravity-actuated means rotatively mounted in said support to form an artificial horizon line associated with said air ship and to cause relative rotation between said artificial horizon line and the transverse axis of said miniature air ship, means actuated by gravity and centrifugal force to move said miniature air ship about its transverse axis, said means also being responsive to centrifugal force alone, and a rotor associated with said last named gravity means to indicate in degrees such movement of said miniature air ship about its transverse axis with respect to the support.

4. An inclinometer comprising a support, an indicator rotatably mounted in said support, a lever rotatable about the axis of the indicator relative to said support, a pair of weighted arms pivotally connected to said lever eccentrically of the axis of said indicator, an arm pivoted to said lever eccentrically of the axes of said indicator and the pivots of said weighted arms, links connecting said weighted arms to said second named arm, and a connection between said second named arm and said indicator.

5. An inclinometer comprising a support, an indicator rotatably mounted in said support, a lever rotatable about the axis of the indicator relative to said support, a pair of weighted arms pivotally connected to said lever eccentrically of the axis of said indicator, an arm pivoted to said lever eccentrically of the axes of said indicator and the pivots of said weighted arms, links connecting said weighted arms to said second named arm, and a connection between said second named arm and said indicator, and a resilient means interconnecting said second named arm and said lever to resiliently maintain said weighted arms swung about their respective pivots.

6. An aeronautical inclinometer comprising a support, a miniature ship mounted to tilt fore and aft in said support, weighted means rotatively mounted in said support to form an artificial horizon associated with said ship, means responsive to gravity and centrifugal force, to move the miniature ship about a transverse axis, said means being also responsive to gravity acting alone, to move the miniature ship about a transverse axis, and a rotor associated with said actuating means to indicate in degrees, such movement with respect to the support.

CLARENCE M. LEATHERMAN.